June 1, 1926.
S. MACHINO
HOSE COUPLING
Filed August 15, 1923
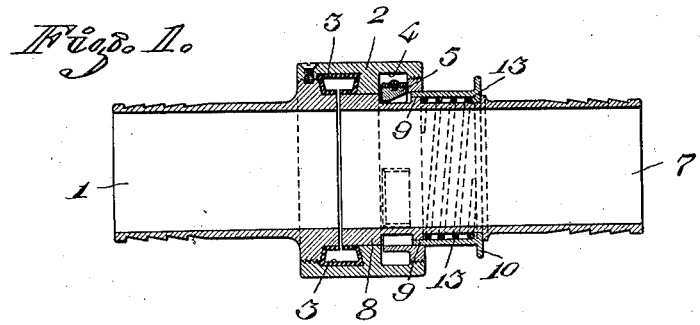
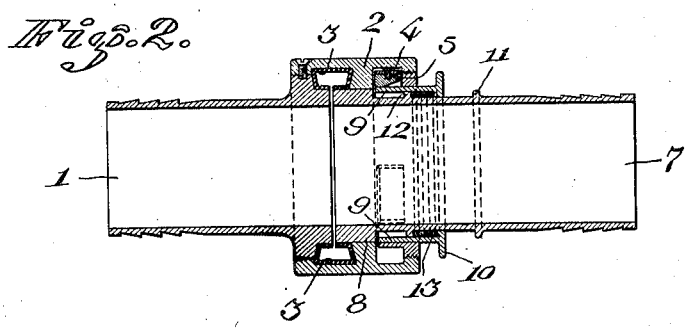
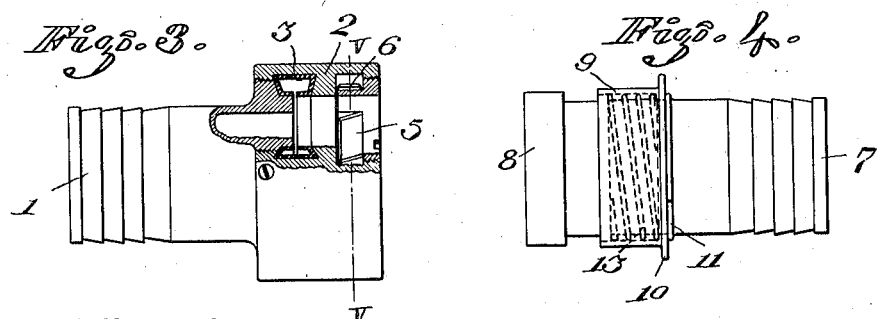
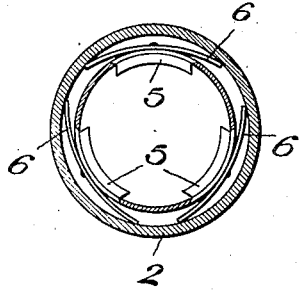
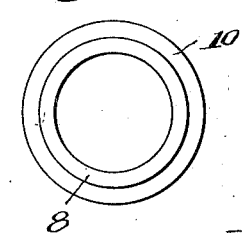
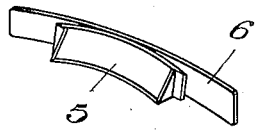
Inventor
S. Machino
By Marks & Clerk
Attys.

Patented June 1, 1926.

1,587,079

UNITED STATES PATENT OFFICE.

SHIGETAKE MACHINO, OF TOKYO-FU, JAPAN, ASSIGNOR TO SHUICHI KATAKURA, OF KOISHIKAWA-KU, TOKYO, JAPAN.

HOSE COUPLING.

Application filed August 15, 1923. Serial No. 657,601.

My invention relates to improvements in couplings for hose and the like water pipes and has for its object to provide couplings easy of connection and disconnection, sound and reliable in use and especially adapted for laying hose in an emergency.

The invention is characterized by the combination of a female member provided with tapered jaws pressed radially inward and a male member provided with a shoulder ring and a sliding sleeve. In ordinary hose couplings the male and the female members need to be connected at a special position as the jaws or claws of each member come into the recesses of the corresponding member and afterward either member or the union collar must be turned, which is apt to cause much trouble and twist the hose. According to the present invention the tapered jaws of the female member come into engagement with the shoulder ring of the male member at any position by directly thrusting the latter without twisting the hose, and can be disconnected by merely pushing the sliding sleeve so that the connection and the disconnection of the coupling is rendered very easy and quick. The jaws are pressed by the springs and the packing ring being hermetically sealed by the water pressure the connection of the coupling is sound and reliable and is especially suited for fire hose.

The annexed drawing shows an example of the hose coupling embodying the present invention.

Fig. 1 is a longitudinal sectional side elevation showing the clutch jaws in engaged state. Fig. 2 is a similar view to Fig. 1, showing clutch jaws in disengaged state. Fig. 3 is a side elevation, partly in section, of the female member of the coupling. Fig. 4 is a side elevation of the male member. Fig. 5 is a cross sectional view of the female nozzle at (V) (V) of Fig. 3. Fig. 6 is an end elevation of the male member. Fig. 7 is a perspective view of a clutch jaw.

In the drawing (1) is a female nozzle to be joined at one end to a hose or any other water pipe, and provided with a collar (2) permanently screwed at the other end. Inside the collar (2) a packing ring (3), forming a channel shape to be operated by the water pressure, is arranged. A circular recess (4) is also formed inside the collar adjacent to the packing ring (3) and in said recess clutch jaws (5), with their inner side tapered and pressed radially inward by spring (6), are arranged. The three jaws are preferably arranged at equal distances as shown in Fig. 3. The nozzle (1) together with the collar (2) provided with the packing ring (3) and the clutch jaws (5) makes up the female member of the coupling.

(7) is the other nozzle forming the male member of the coupling, to be joined to a hose or any water pipe. The nozzle (7) is provided at one end with shoulder ring (8) to be engaged with the clutch jaws of the female member. A disengaging sleeve (9) is loosely fitted on the nozzle (7). Said sleeve has flange (10) positioned between projections (11) and (12) whereby the longitudinal slide of the sleeve is properly restricted and the sleeve is prevented from being removed from the nozzle. The sleeve (7) is usually pressed outward by a spiral spring (13) wound between said sleeve and the nozzle (7).

When it is desired to connect the coupling the male member is pressed into the female member so that the shoulder ring (8) of the nozzle (7) presses the jaws (5) radially outward at their inclined surface. When the rear part of the shoulder ring (8) passes over the jaws they are projected inwardly by their springs (6) and are caught at the shoulder of the ring (8). Thus the coupling is connected as shown in Fig. 1. When it is desired to disconnect the coupling, the sliding sleeve (9) of the male member is pressed inward against the spring 13 so that the jaws (5) are pressed outward, whereby they are disengaged from the shoulder ring (8) and the male member can be pulled off directly. The diameter of the disengaging sleeve therefore must be equal to or a little larger than that of the shoulder ring (8).

While the coupling is connected and water flows therein the pressure acts inside the channel shaped packing ring (3) and presses it against the abutting end of the male nozzle or its shoulder ring (8) whereby the coupling is hermetically sealed under water pressure. Each jaw (5) being pressed radially inward by the spring (6), and the disengaging sleeve (9) being pressed outward by the spring (13), the coupling maintains its connected state and never becomes loosened by accident. As the jaws (5) are placed at equal distances around the circular groove (4), and the shoulder ring (8)

extends entirely around the nozzle (7), the male and female members of the coupling can be connected at any position by directly forcing them together, and can be disconnected by merely pushing the sleeve (9) so that the connection and the disconnection of the coupling are rendered easy and the twisting of the hose is avoided.

I claim:—

A coupling including a first nipple provided at one end with an annular enlargement having an internal annular shoulder and a plurality of internal annular grooves, one of said grooves merging into said shoulder, a channel shaped packing ring arranged in the last mentioned groove and adapted to be expanded by the fluid passing through the coupling, jaws arranged in the other groove, normally projecting into the bore of the enlargement and having inner faces inclined in a direction from the outer end of the enlargement toward the axis of the nipple, a second nipple extending into said bore and having an annular flange bearing against said packing and adapted to be engaged by said jaws for locking the two nipples together, leaf springs in one of said grooves for normally forcing the jaws toward the axis of the nipples, said flange being free to turn a complete revolution about the axis of the nipples, a releasing ring slidably mounted on the second nipple, of greater diameter than said flange and adapted to force the jaws outwardly when the releasing ring is moved into the bore of said enlargement, spaced annular abutments on the second nipple, an internal flange on the releasing ring movable between said abutments, and a spring interposed between one of said abutments and the internal flange of the releasing ring for normally holding the releasing ring in inoperative position, the bores of the two nipples being of the same diameter.

In testimony whereof I have affixed my signature.

SHIGETAKE MACHINO.